2 Sheets—Sheet 1.

W. W. VAUGHN & S. JACKSON.
Well-Boring Apparatus.

No. 198,058. Patented Dec. 11, 1877.

Witnesses
Jno. L. Boone
Geo. H. Strong.

Inventor
Walter W. Vaughn
Sum Jackson
by Dewey & Co.
Attys.

2 Sheets—Sheet 2.

W. W. VAUGHN & S. JACKSON.
Well-Boring Apparatus.

No. 198,058. Patented Dec. 11, 1877.

Witnesses
Jno. L. Boone
Geo. H. Strong

Inventor
Walter W. Vaughn
Sum Jackson
by Dewey & Co.
Attys.

UNITED STATES PATENT OFFICE.

WALTER W. VAUGHN AND SURN JACKSON, OF STOCKTON, CALIFORNIA.

IMPROVEMENT IN WELL-BORING APPARATUS.

Specification forming part of Letters Patent No. 198,058, dated December 11, 1877; application filed September 17, 1877.

*To all whom it may concern:*

Be it known that we, WALTER W. VAUGHN and SURN JACKSON, of Stockton, county of San Joaquin, and State of California, have invented an Improved Well-Boring Apparatus; and we do hereby declare the following to be a full, clear, and exact description thereof, reference being had to the accompanying drawings.

Our invention relates to an improved apparatus for boring wells and other holes in the ground; and it consists, first, of a novel arrangement for hoisting the loaded cylinder to the surface and discharging its contents; and, second, of a device for forcing the curbing down the hole as the boring progresses, all compactly arranged and easily operated, as hereinafter more fully shown and described.

Figure 1:
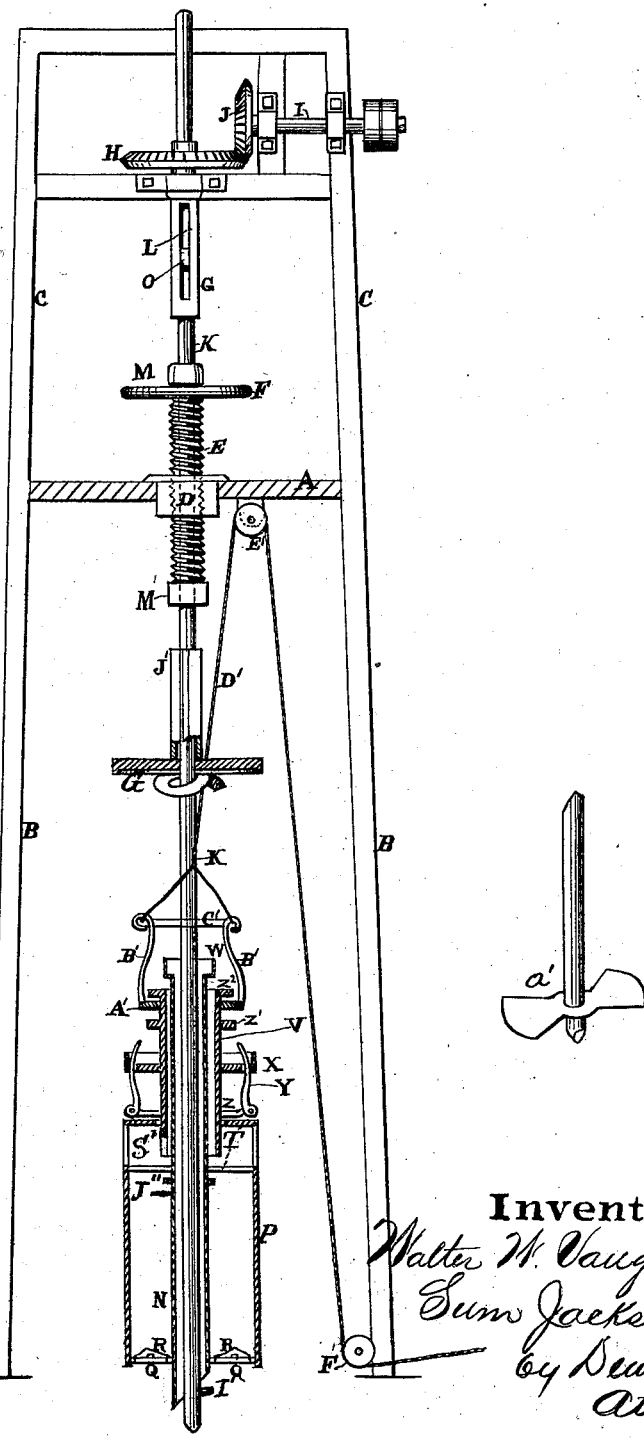
Figure 2:
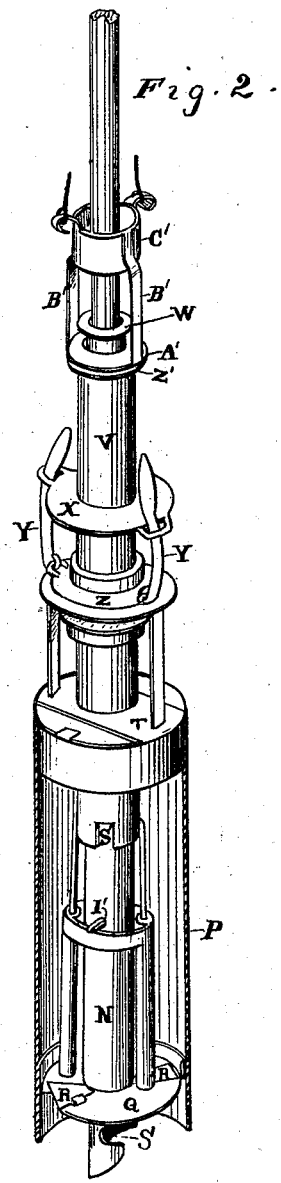

Referring to the accompanying drawings, Figure 1 is a view of our apparatus, and Fig. 2 is a perspective of the same.

Let A represent a platform or table, which is mounted upon legs B B over the place where the well or hole is to be bored. This elevated platform we anchor firmly to the ground. C is a frame-work, which is erected upon the table. In the center of the table A we secure a permanent nut, D, through which a short hollow screw, E, passes vertically. On the upper end of this screw is a hand-wheel, F, by means of which the screw can be turned and fed up or down, as desired. On the lower cross-timber of the frame C we mount a short vertical tubular shaft, G, in a box directly in line with the tubular screw. To the upper end of this shaft a bevel-wheel, H, is secured. I is the horizontal driving-shaft, on the end of which a bevel-wheel, J, is secured, so as to engage with the bevel-gear on the tubular shaft. The forcing and boring rod K passes down through the tubular shaft G and hollow screw E. The tubular shaft G has a slot, L, on one side, in which a pin, O, on the rod K moves, so that the rod can slide up and down through the tube the length of the slot. A collar, M, is secured on the shaft above the hollow screw, and another, M', below it, so that the rod K can rotate inside of the screw without sliding longitudinally through it. This shaft can be lengthened to any desired extent by attaching sections of rod thereto. The lower end of the lowermost section we form into a boring-bit, which leads the boring apparatus. P is the boring-cylinder. The earth-auger consists of a tube, N, having the horizontal curved bits Q at its lower end. A space is made between the radial edges of these bits, and a valve, R, is hinged to one of the edges, so as to drop down and close the space when the auger is lifted. The tube N extends a short distance below the cutting-bits, and this extension is cut off at an angle, as represented. A notch, S, is made in one side of this inclined extension, for the purpose hereinafter described. This angle we pass down into the cylinder P, so that the opposite end of the tube N projects above it a short distance, and passes through a yoke or bail, T, which extends across the upper end of the cylinder. A button or flange on this tube strikes the under side of the yoke or bail, so that by lifting upward on the tube both the cylinder and auger are lifted together.

A loose sleeve, V, fits over the tube above the yoke, and is prevented from slipping off over its upper end by a flange, W, which is formed around the upper edge of the tube.

A wide flange or rim, X, is secured around this sleeve, and one or more reamers, Y, which have their lower ends hinged to a loose ring, Z, below, pass up through slots in the outer edge of the ring or flange, so that when the flange or rim X drops down the reamers will drop outward; but when the sleeve is drawn upward the flange will move upward with the sleeve and draw the reamers inward to permit the cylinder to be lifted out of the well.

The flanges $Z^1$ $Z^2$ are formed on the sleeve V near its upper end, and between said flanges a ring, A', fits loosely. This ring is connected by upright connections B' B' with another ring, C', above the end of the tube N.

In adjusting this apparatus the boring-rod is disconnected at some suitable point, and the tube N slipped down over it, and also the ring C'. The rod is then connected again, and the tube N allowed to slip down to the lower end of the rod. A rope, D', is then attached to the ring C', and is passed up over a pulley, E', on the under side of the table A, and thence down to the ground under a pulley, F'.

A pin, I', on the lower end of the boring-rod arrests the tube, and when the boring commences this pin engages with the notch S in the tube N, and connects the motion of the two so that the auger is carried around with the rod. A pin, J'', on the tube N engages with a slot, S', in the lower end of the sleeve V, so that said sleeve can also be turned with the tube or auger N.

The auger N and boring-bit are fed downward by turning the screw E so as to force them into the ground. The earth which is raised by the auger passes through the upward lifting-valves R until the cylinder is filled, when a slight reverse motion of the forcing-rod releases the pin I' from the notch S, after which the cylinder can be raised to the surface along the rod and emptied.

When the auger and cylinder are in operation at the lower end of the rod the rope D' is slack, so that the sleeve V, with its flange X, drops down, thus allowing the reamers to fall outward and enlarge the diameter of the bore for the casing.

By means of the screw E we can feed the auger at any desired rate of speed, and when the screw has been moved downward its full length the collars M M' may be loosened, and the rod K allowed to slip through it while the screw is being elevated, after which the collars are again secured, and the auger is ready to be fed down the length of the screw again.

To steady and brace the rod K as it is lengthened by additional sections, we employ ring-braces G', which we lower and secure at different points along the length of the rod. These rings are large enough to form bracing-partitions against the wall of the bore at intervals.

By removing the auger and tube the cylinder P can be used as a borer, in which case the rod K is shortened by removing one of its sections, so that the short tube J', which is secured around rod K, will fit between the screw E and the cylinder, whereby the lower end of this tube J' presses upon the upper edge of the cylinder, so that, as the screw is fed downward, it forces the cylinder down into the earth, thus filling the same, after which the cylinder can be raised and emptied in any desired manner.

Instead of the hinged valves in the auger-bits we will sometimes use two plates similar to that shown at $a'$. These plates we will secure to the auger, so that when it is rotated in one direction the plates will separate and leave openings through which the earth can pass into the cylinder; but when the auger is rotated slightly in an opposite direction, they will close the openings.

This well-borer is quite simple in construction, and is easily handled. It will bore holes in the earth with great speed, and the dirt can be removed from the bore with little trouble.

Having thus described our invention, what we claim, and desire to protect by Letters Patent, is—

1. The elevated platform or table A, provided with the permanent nut D and hollow vertical screw E, and having the frame-work C with its vertical tubular shaft G, with its bevel-gear H, and horizontal driving-shaft I, with its bevel-gear J, in combination with the forcing or boring rod K, with its collars M M', substantially as and for the purpose described.

2. The forcing and boring rod K, in combination with the auger Q N and its sleeve V, said sleeve being provided with flanges $Z^1 Z^2$ for retaining the ring A' with its upright connections B' B' and the ring C', substantially as and for the purposes described.

3. The short tube J', attached to the forcing and boring rod K, and arranged to force the curbing into the bore by the action of the same screw E which lowers the boring apparatus, substantially as specified.

In witness whereof we have hereunto set our hands and seals.

WALTER W. VAUGHN. [L. S.]
SURN JACKSON. [L. S.]

Witnesses:
FRANK A. BROOKS,
WILL L. TAYLOR.